(12) United States Patent
Jardin

(10) Patent No.: US 6,600,991 B1
(45) Date of Patent: Jul. 29, 2003

(54) NEIGHBORING OPTIMAL AIRCRAFT GUIDANCE IN A GENERAL WIND ENVIRONMENT

(75) Inventor: Matthew R. Jardin, Mountain View, CA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 34 days.

(21) Appl. No.: 09/932,566

(22) Filed: Aug. 14, 2001

(51) Int. Cl.$^7$ ............................................. G01C 21/00
(52) U.S. Cl. ........................ 701/206; 701/7; 701/210; 342/26
(58) Field of Search ................................. 701/206, 200, 701/201, 210, 2, 7; 73/178 R; 342/26

(56) References Cited

U.S. PATENT DOCUMENTS

| | | | |
|---|---|---|---|
| 4,086,632 A | 4/1978 | Lions | 701/210 |
| 4,354,237 A | 10/1982 | Lambregts et al. | 701/16 |
| 4,499,665 A | 2/1985 | Davis | 33/1 SB |
| 4,513,378 A | 4/1985 | Antkowiak | 701/217 |
| 4,706,198 A | 11/1987 | Thurman | 165/109.1 |
| 4,949,267 A | 8/1990 | Gerstenfeld et al. | 701/120 |
| 5,051,910 A * | 9/1991 | Liden | 701/204 |
| 5,121,325 A | 6/1992 | DeJonge | 701/123 |
| 5,797,106 A | 8/1998 | Murray et al. | 701/11 |
| 5,916,297 A | 6/1999 | Griffin et al. | 701/11 |
| 6,059,226 A | 5/2000 | Cotton et al. | 244/17.13 |
| 6,085,147 A | 7/2000 | Myers | 701/209 |
| 6,092,007 A * | 7/2000 | Cotton et al. | 701/4 |
| 6,134,500 A * | 10/2000 | Tang et al. | 701/202 |
| 6,266,610 B1 * | 7/2001 | Schultz et al. | 701/201 |

OTHER PUBLICATIONS

A.E. Bryson et al, Applied Optimal Control, Hemisphere Publ. Corp., New York, 1975, pp. 177–211.

* cited by examiner

Primary Examiner—Thomas G. Black
Assistant Examiner—Arthur D. Donnelly
(74) Attorney, Agent, or Firm—Robert M. Padilla

(57) ABSTRACT

Method and system for determining an optimal route for an aircraft moving between first and second waypoints in a general wind environment. A selected first wind environment is analyzed for which a nominal solution can be determined. A second wind environment is then incorporated; and a neighboring optimal control (NOC) analysis is performed to estimate an optimal route for the second wind environment. In particular examples with flight distances of 2500 and 6000 nautical miles in the presence of constant or piecewise linearly varying winds, the difference in flight time between a nominal solution and an optimal solution is 3.4 to 5 percent. Constant or variable winds and aircraft speeds can be used. Updated second wind environment information can be provided and used to obtain an updated optimal route.

32 Claims, 4 Drawing Sheets

NEIGHBORING OPTIMAL AIRCRAFT GUIDANCE IN A GENERAL WIND ENVIRONMENT

ORIGIN OF THE INVENTION

The invention disclosed herein was made by employees of the United States Government and may be manufactured and used by or for the Government for governmental purposes without payment of any royalties for such manufacture and use.

FIELD OF THE INVENTION

This invention relates to optimization of a flight route of an aircraft in an environment with constant or variable winds.

BACKGROUND OF THE INVENTION

Commercial and private aircraft travel great distances, 500 to 5,000 miles, at varying altitudes and are subjected to winds up to 100 knots (120 miles per hour) in varying directions. Over the course of a long flight, requiring several hours to complete, the aircraft may change course and/or change altitude to avoid a heavy storm or a second aircraft that is climbing through the first aircraft's present cruise altitude. Even if the aircraft cruises at a fixed altitude, the prevailing winds will vary strongly in magnitude and direction from one along the route. For typical wind patterns encountered across the North American continent (e.g., in a flight from New York to San Francisco), traveling a wind-optimized flight route can reduce flight time, relative to flight time over a great circle route, by up to 8 percent. For a flight from the JFK Airport in New York to the San Francisco Airport, this reduction in time can be 20 minutes or more. For shorter flights, the aircraft flight speed, the wind speed and wind shear are also lower and the relative effect of variable local winds is stronger, and the ratio of time required to travel a great circle route and time required to travel an optimized route is approximately constant.

However, computation from first principles of an optimal flight route between first and second waypoints in the presence of variable, even piecewise linear, wind direction and speed requires complex calculations involving many variables and may require too much time to be practical. What is needed is a less complex approach that provides a near-optimal flight route and that can compensate for the changing wind conditions encountered by an aircraft in flight. Preferably, the approach should allow use of raw numerical data or of analytical approximations for wind speed and direction encountered along a flight path and should allow for variable aircraft speed and altitude along the flight path.

SUMMARY OF THE INVENTION

These needs are met by the invention, which begins with a nominal solution that satisfies the source and destination waypoint constraints and applies a neighboring optimal control ("NOC") and guidance analysis to a wind velocity vector field and aircraft speed prescription and provides a near-optimal flight route, which does not require huge computation times or a supercomputer to perform the analysis. The NOC analysis uses a feed-forward and linear feedback procedure for computing a near-optimum route at the wind velocity vector changes along the route. The computations are performed for dimensionless variables so that a given NOC solution can be applied to many other problems through appropriate scaling.

DESCRIPTION OF BEST MODES OF THE INVENTION

Figure 1:
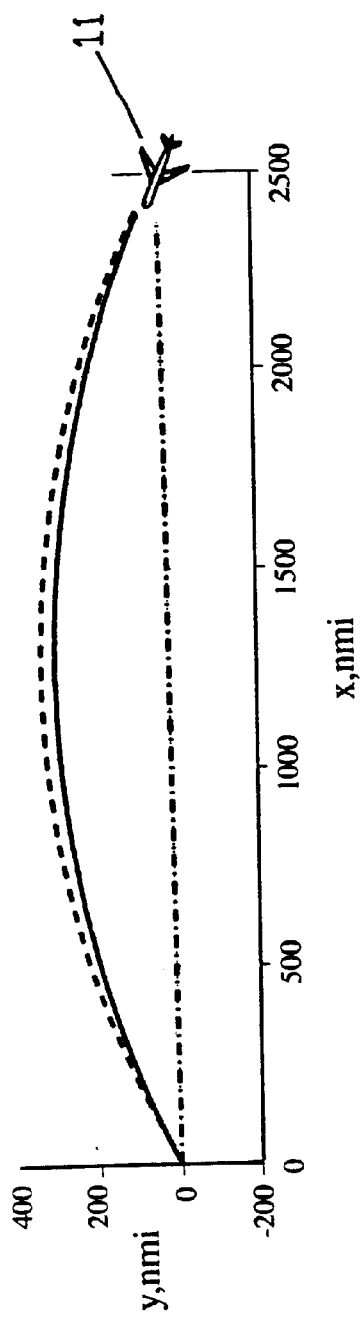
FIGS. 1, 3 and 5 graphically illustrate optimal flight routes computed using an NOC analysis for two representative wind patterns, as a function of flight distance remaining.

FIG. 1 illustrates a windy environment in which an aircraft 11 operates. The aircraft 11 has a velocity vector $V_w=(V \cdot \cos \theta, V \cdot \sin \theta)$ in a plane with Cartesian coordinates (x,y) and is subjected to a wind velocity vector field $V_w=(u(x,y),v(x,y))$. The aircraft airspeed $|V|=V$, assumed constant here, is measured relative to the air mass, and $\theta$ is a heading angle, measured in a plane and used as a control variable to minimize a time required to travel from a first waypoint (source) to a second waypoint (destination).

Neighboring Optimal Control ("NOC") is a time varying linear feedback control approach that begins with a nominal solution (correct in the absence of other perturbations) and minimizes a performance index to second order in certain perturbed variables and parameters. In an NOC approach, feedback gains are variable and are tabulated as functions of a time-to-go parameter $\tau$ (or of an along-track distance-to-go parameter). A perturbation in accumulated time from source to destination is estimated using a performance index J. The formalism is discussed by A. E. Bryson and Y. C. Ho, in *Applied Optimal Control: Optimization, Estimation and Control*, Hemisphere Publ. Corp., New York, 1975, pp. 148–158, 179–203. The invention extends this formalism by modeling winds as additional states of the system.

Figure 2:
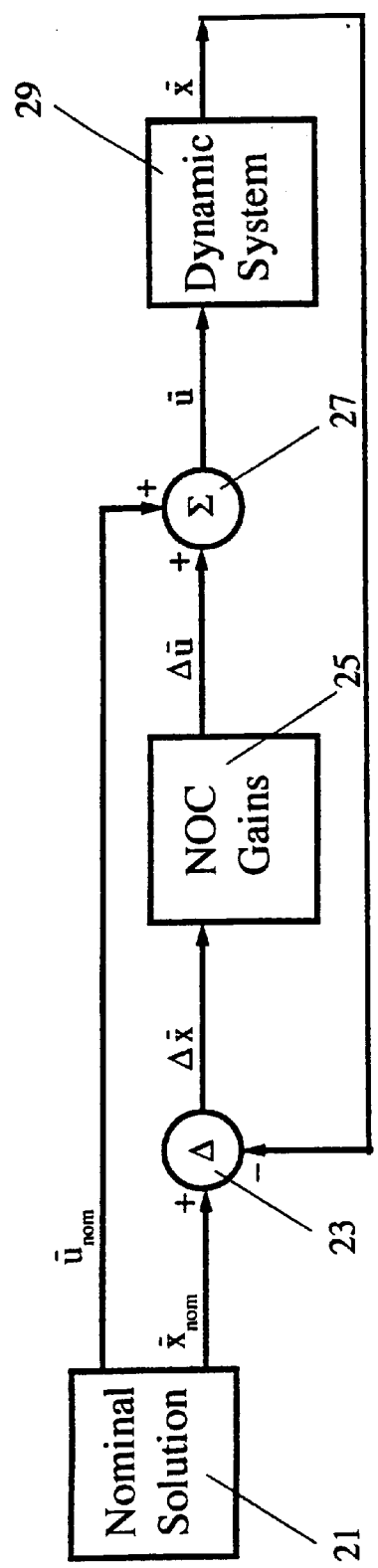
FIG. 2 is a block diagram illustrating one embodiment of the control algorithm used in the invention.

FIG. 2 illustrates a feedback/feedforward configuration used to control a state vector perturbation $\delta x=(\delta x, \delta y, \text{etc.})$ in the presence of variable cross-track wind shear, using an NOC approach. The control vector perturbation in a simple situation is $\delta u=(\delta \theta)$, where $\theta$ is a heading angle $\theta$ for the aircraft. A nominal solution (flight route, aircraft heading angle, etc.) is provided by a nominal solution module 21, with associated state variables $x_{nom}$ and wind velocity variables $(u,v)_{nom}$ as a function of a route variable, such as time or time-to-go. The actual or assumed wind pattern $(u(x,y),v(x,y))$ and other relevant control variables are provided by a dynamics module 29. Nominal solution state vector values and control vector values are computed and provided by the module 21 and are received at a first input terminal (+) of a difference module 23 (state values) and at a first input terminal (+) of a sum module 27 (control values). The dynamics module 29 generates and issues a state vector x that is received at a second input terminal (−) of the difference module 23. The first difference module 23 forms and issues a difference state vector $\Delta x = x_{nom} - x$ that is received by an NOC gain matrix module 25. The gain matrix module 25 multiplies pre-computed NOC gains by component values of a state difference vector $\Delta x$ and generates and issues a control difference vector $\Delta u$, which is received at a second input terminal (+) of the sum module 27. The sum module 27 forms and issues a (corrected) control vector $u=u_{nom}+\Delta u$, which is received by the dynamics module 29 and used to determine a new output signal, the state vector x.

The system is initially expressed in spherical coordinates $(\Theta,\Phi)$ on a (nearly) spherical Earth. One then rotates the coordinate system to a new system $(\Theta_{rot},\Phi_{rot})$ for which a nominal path great circle route lies on the equator $(\Theta_{rot}=0)$ in the new "normalized" coordinate system and the route destination corresponds to the azimuthal or longitude angle $\Phi_{rot}=0$. For a route from point B $(\Theta_B,\Phi_B)$ to point A $(\Theta_A,\Phi_A)$, one first computes an intermediate angle $$\beta=a\tan 2\{-\cos\Theta_A\sin\Theta_B+\sin\Theta_A\cos\Theta_B\cos(\Phi_A-\Phi_B),\sin(\Phi_B-\Phi_A)\cos\Theta_B\}. \quad (1A)$$

Intermediate dimensionless variables $$\phi_1=\sin(\Phi_A-\Phi_P)\cos\Theta_P, \quad (1B)$$

$$\phi_2=\cos\Theta_A\sin\Theta_P-\sin\Theta_A\cos\Theta_P\cos(\Phi_A-\Phi_P), \quad (1C)$$

$$x'_{PA}=x_{PA}/R=-(\phi_1\cos\beta+\phi_2\sin\beta), \quad (1D)$$

$$y'_{PA}=y_{PA}/R=(\phi_1\cos\beta-\phi_2\sin\beta), \quad (1E)$$

$$z'_{PA}=z_{PA}/R=\{\sin\Theta_A\sin\Theta_P+\cos\Theta_A\cos\Theta_P\cos(\Phi_A-\Phi_P)\}, \quad (1F)$$

are then computed, where R is the distance (assumed to be constant) from the center of the Earth to the aircraft location (point P) in flight. The latitude and longitude (angular variables) $(\Theta_P,\Phi_P)$ for a general point become $$\Theta_P=-\sin^{-1}(y'_{PA}), \quad (1G)$$

$$\Phi_P=a\tan 2\{x'_{PA},-z'_{PA}\}. \quad (1H)$$

Dropping the subscripts on the coordinates $(\Theta_R,\Phi_R)$, equations of motion for the aircraft with heading angle $\theta$ and wind velocity vector $(u,v)$ become $$d\Theta/dt=\{V\cos\theta+u\}/(R\cos\Phi), \quad (2)$$

$$d\Phi/dt=\{V\sin\theta+v\}/R. \quad (3)$$

Equations (2) and (3) can be simplified by using the approximations $\cos\Phi\approx 1$ and introducing the definitions $$x\approx R\cdot\Phi, \quad (4A)$$

$$y\approx R\cdot\Theta, \quad (4B)$$

$$L/R=\Theta_{R0}=\text{initial longitude in rotated coordinates}, \quad (4C)$$

$$x'=x/L(0\leq x'\leq 1), \quad (4D)$$

$$y'=y/L \quad (4E)$$

$$t'=V\cdot t/L, \quad (4F)$$

$$\eta_u=u/V, \quad (4G)$$

$$\eta_v=v/V, \quad (4H)$$

Equations (2) and (3) become $$dx'/dt'=\cos\theta+\eta_u, \quad (5)$$

$$dy'/dt'=\sin\theta+\eta_v, \quad (6)$$

$$\partial x'/\partial t'=f(x',\eta,t'), \quad (7)$$

The nominal path and nominal solution correspond to $\theta=0$, $y'=0$, $\eta_u=\eta_v=0$, $$\cos\theta+\eta_u \quad (8)$$

$$f=\sin\theta+\eta_v$$

$$0,$$

where f is a dynamics vector depending upon the values of the state vector $x'=(x',y')$ and values of the control vector u (including the heading angle $\theta$) and "0" represents one or more zero components of the dynamics vector f, such as wind vector component values at selected intermediate locations along the route.

In determining an optimal solution in the presence of variable wind, the (transformed) path is decomposed into a grid of end-to-end segments, and the normalized wind velocity vector components, $\eta_u$ and $\eta_v$, are assumed to be piecewise linear within each segment, $(i-1)/(N_w-1)\leq x'\leq i/(N_w-1)$ $(N_w=N_u, N_{us}, N_v$ or $N_{vs})$ for $i=1,\ldots,N_w-1$, between two consecutive grid points:

$$\eta_u(x',y')=-\eta_{us}(x')\cdot y'+\eta_u(x'), \quad (9)$$

$$\eta_v(x',y')=-\eta_{vs}(x')\cdot y'+\eta_v(x'), \quad (10)$$

Within this range of the coordinate x', a piecewise linear wind velocity component $\eta_w(x',y')$ (w=u, us, v, vs) can be expressed as $$\eta_w(x',y')=\eta_{w,i}+(\eta_{w,i+1}-\eta_{w,i})\{(N_w-1)x'-(i-1)\}, \quad (11)$$

where $\eta_{w,i}$ and $\eta_{w,i+1}$ are the values of the variable $\eta$ at grid points $x'=(i-1)/(N_w-1)$, $x'=i/(N_w-1)$, and $N_u$ and $N_v$ are optionally different integers.

Equations (5) and (6) become $$\partial x'/\partial t'=\cos\theta-\eta_{us}(x')\cdot y'+\eta_u(x'), \quad (12)$$

$$\partial y'/\partial t'=\sin\theta-\eta_{vs}(x')\cdot y'+\eta_v(x'). \quad (13)$$

The dynamic model is augmented with constraints $$\partial\eta_u/\partial t'=0, \quad (14A)$$

$$\partial\eta_{us}/\partial t'=0, \quad (14B)$$

$$\partial\eta_v/\partial t'=0, \quad (14C)$$

for the values at each grid point. The first and second derivatives of the system equations are now piecewise linear functions of the coordinate y'. Other wind models might be used. Because of the linearization by NOC, only the linear variations remain.

The system has a corresponding Hamiltonian $$H=\lambda_{x'}(\cos\theta+\eta_u(x',y'))+\lambda_{y'}(\sin\theta+\eta_v(x',y'))+1, \quad (15)$$

where $\lambda_{x'}$ and $\lambda_{y'}$ serve as Lagrange multipliers, to be determined, and $\eta_u=\eta_v=0$. The Euler-Lagrange equations of motion for the system (H. Goldstein, *Classical Mechanics*, Addison-Wesley Publ., 1953, pp. 36–38, 215–234) for this system become $$\partial\lambda_{x'}/\partial t'=-\partial H/\partial x'=-\lambda_x\partial\eta_u/\partial x'-\lambda_y\partial\eta_v/\partial x', \quad (16)$$

$$\partial\lambda_{y'}/\partial t'=-\partial H/\partial y'=-\lambda_x\partial\eta_u/\partial y'-\lambda_y\partial\eta_v/\partial y', \quad (17)$$

$$0=\partial H/\partial\theta=(-\lambda_x\sin\theta+\lambda_y\cos\theta). \quad (18)$$

Equation (18) requires that $$\lambda_{y'}/\cos\theta-\lambda_{x'}/\sin\theta=0. \quad (19)$$

The Hamiltonian H is not an explicit function of time, and H=constant is an integral of the system. Here, the constant is set equal to 0. Equations (15) and (19) have the simultaneous solutions $$\lambda_{x'} = -\cos\theta/\{1+\eta_u \cos\theta + \eta_v \sin\theta\}, \quad (20)$$

$$\lambda_{y'} = -\sin\theta/\{1+\eta_u \cos\theta + \eta_v \sin\theta\}, \quad (21)$$

One first computes a solution of a nominal trajectory, corresponding to the following choices:

$$0 \leq x' \leq 1, \quad (22A)$$

$$y' = 0, \quad (22B)$$

$$\eta_{w,i}(x'y') = 0 (w=u, v; i=0, 1, \ldots, N_w-1), \quad (22C)$$

$$\theta_{nom} = \pi. \quad (22D)$$

For the nominal solution of Eqs. (22A)–(22D), two of the Lagrange multipliers are found to be constants:

$$\lambda_{x'} = 1, \quad (23A)$$

$$\lambda_{y'} = 0. \quad (23B)$$

A vector $\lambda(t')$ of other Lagrange multipliers at the final time $t' = t'f$ satisfies additional boundary conditions:

$$\lambda(t'f) = \{(\partial\psi/\partial x')^T V\}_{t'f}, \quad (24)$$

where $\psi$ is a column vector representing final state constraints, v is a column vector representing undetermined multipliers, x' is a (dimensionless) vector including the location and wind parameter states, t'f denotes time corresponding to the final state, the superscript "T" indicates vector transposition, and $$\psi = \begin{matrix} x' - x'f \\ y' - y'f \end{matrix}. \quad (25)$$

The partial derivatives of the state vector components are easily computed, and the Lagrange multipliers have the following values for the nominal solution:

$$v_{x'} = \lambda_{x'} = 1, \quad (26A)$$

$$v_{y'} = \lambda_{y'} = 0, \quad (26B)$$

$$\lambda_{ui} = 0 (1 \leq i \leq N_u), \quad (26C)$$

$$\lambda_{vi} = 0 (1 \leq i \leq N_v). \quad (26D)$$

A Backward Sweep method, discussed by A. E. Bryson and Y. C. Ho, op cit, is used here to obtain an NOC solution. Other methods that can be used to compute feedback gains and obtain nominal optimal solutions include Newton, Newton-Raphson, quasi-Newton, gradient algorithms and shooting algorithms. These methods can be used to obtain an optimal solution for nominal conditions (e.g., with zero wind or a constant wind vector). Each state parameter is then perturbed slightly while holding each of the other parameters constant. By computing the resulting changes in $\theta$ and in tf corresponding to changes in the state parameters (e.g., positions and wind vectors), the neighboring optimal feedback gains may be computed numerically, using a perturbation in $\theta$ or tf divided by a perturbation in each of the state parameters.

One result of application of the Backward Sweep method is numerical values of the perturbation feedback gains at specific values of the (dimensionless) coordinate x'. These perturbation values are then tabulated for look-up during application of the NOC approach. The final expression for computing a perturbed optimal heading angle $\theta$ from the feedback gains and state perturbations is expressed as a single component vector $$\delta\theta = -K_{\theta x'}\delta x', \quad (27A)$$

$$\delta t'f = -K_{t'x'}\delta x', \quad (27B)$$

where the feedback gain matrix coefficients, $K_{\theta x'}$ and $K_{t'x'}$, are given generally by $$K_{\theta x'} = -H_{uu}^{-1}\{H_{ux} + f_u^T(S^\wedge - R^\wedge Q^{\wedge -1} R^T)\}. \quad (28A)$$

$$K_{t'x'} = (m^T/\alpha) - (n^T/\alpha)Q^{-1}R^T, \quad (28B)$$

The quantity $H_{uu}^{-1}$ is generally a matrix (here, a scalar) whose entries are the second derivatives of the Hamiltonian H in Eq. (15) with respect to components of the control vector u (here, the scalar heading angle $\theta$), $f_u$ is a vector whose entries are the partial derivatives of the dynamics vector f with respect to components of the control vector u (here, the heading angle $\theta$).

The matrices $Q^\wedge$, $R^\wedge$ and $S^\wedge$ are computed according to $$Q^\wedge = Q - (n^T n)/\alpha, \quad (29A)$$

$$R^\wedge = R - (m^T n)/\alpha, \quad (29B)$$

$$S^\wedge = S - (m^T m)/\alpha, \quad (29C)$$

and Q, R, S, m, n and $\alpha$ are matrix solutions of the following equations:

$$A(t) = -f_x f_u H_{uu}^{-1} H_{ux}, \quad (30)$$

$$B(t) = f_u H_{uu}^{-1} f_u^T, \quad (31)$$

$$C(t) = H_{xx} - H_{xu} H_{uu}^{-1} H_{ux}, \quad (32)$$

$$\Omega(x', u, v, t' = t'f) = (d\Phi/dt' + L)_{t'f} = 0. \quad (33)$$

$$\Phi(x,t) = \Phi(x,t) + v^T\psi(x,t), \quad (34A)$$

$$dS/dt' = -SA - A^T S + SBS - C, \quad (34B)$$

$$S(t'f) = (\partial^2\phi/\partial x^2)_{t'f} \quad (34C)$$

$$dR/dt' = -(A^T - SB)R, \quad (35A)$$

$$R(t'f) = (\partial\psi/\partial x)_{t'f} \quad (35B)$$

$$dQ/dt' = R^T BR, \quad (36A)$$

$$Q(t'f) = 0, \quad (36B)$$

$$dm/dt' = -(A - SB)m, \quad (37A)$$

$$m(t'f) = (\partial\Omega/\partial x)_{t'f}^T, \quad (37B)$$

$$dn/dt' = R^T Bm, \quad (38A)$$

$$n(t'f) = (\partial\psi/\partial t')_{t'f} \quad (38B)$$

$$d\alpha/dt' = m^T Bm, \quad (39A)$$

$$\alpha(t'f) = (\partial\Omega/\partial t')_{t'f} \quad (39B)$$

Development and use of these relations are discussed in Bryson and Ho, op cit, pp. 179–203.

Feedback gain coefficients $K_{y'}(x')$, $K_{us,i}(x')$, $K_{v,i}(x')$, $K_{t'u}(x')$ and $K_{t'v}(x')$ are computed for a sequence of selected values of the nominal variable $x'(0 \leq x' \leq 1)$, such as $x'=0$, 0.005, 0.01, 0.015, . . . , 1.000, and are provided as lookup table values. Any reasonable grid size will suffice here, provided the quantization errors are kept within tolerable limits. The feedback relation (27) is used here to compute a perturbation in the heading angle (control variable) θ:

$$\Delta\theta = -K_{x'}\Delta x' - K_{y'}\Delta y' - \sum_{i=1}^{N} K_{us,i}\Delta(\partial u_s/\partial y')_i - \sum_{i=1}^{} K_{v,i}(\Delta v)_i. \quad (40)$$

NOC routing with variable winds uses linear feedback of perturbations in the wind field (u,v) along a flight path to modify the aircraft heading angle to achieve a minimum time flight path. The algorithm uses the following procedure.

(1) Convert aircraft latitude and longitude into rotated angular coordinates so that a nominal flight path lies on a great circle on the equator, with the destination waypoint corresponding to the rotated prime meridian.

(2) Introduce dimensionless, normalized location coordinates (x',y'), with $0 \leq x' \leq 1$ and y'=0 corresponding to a nominal solution flight path (optional).

(3) Compute state perturbations for the present aircraft and wind states, vis-a-vis the corresponding nominal solution values.

(4) Interpolate feedback gain coefficients K from lookup tables.

(5) Multiply the gain coefficients by the corresponding state perturbations and sum the products, as indicated in Eq. (40).

(6) Add the heading angle perturbation to the nominal heading angle to obtain a resulting heading angle in the dimensionless coordinate system.

(7) Convert to a resulting heading angle in the original (dimensioned) coordinate system.

(8) Repeat the steps (3)–(7) for selected points along the route until the destination waypoint is reached.

Step (2) is optional, and the analysis can be carried out in standard (non-normalized) coordinates. Equations (1A)–(1H) and (4A)–(4E) are applied to convert to normalized, dimensionless coordinates. With reference to step (3), the primary perturbations relative to a nominal solution path are $$\Delta y'=y'-0(\text{nom}), \quad (41A)$$

$$\Delta\eta_{u,i}=\eta_{u,i}(i=1,\ldots,N_u), \quad (41B)$$

$$\Delta\eta_{v,i}=\eta_{v,i}(i=1,\ldots,N_v). \quad (41C)$$

The wind components typically are provided at selected grid points and are resolved along North and East directions and must be rotated and translated in order to express the wind components in a rotated coordinate system, such as the normalized coordinate system.

FIG. 1 illustrates a wind-optimal trajectory that might be experienced by an aircraft flying from the East Coast to the West Coast of the United States, or inversely, with flight parameters $$V=480 \text{ knots (552.4 miles per hour)}, \quad (42A)$$

$$u(x',y')=-u_s y', \quad (42B)$$

$$v(x',y')=0, \quad (42C)$$

$$V/h=u_s=0.2(h=2400 \text{ nmi}). \quad (42D)$$

In this example, only one measurement point is provided for $u_s$. In this implementation of the invention, the nominal solution corresponds to $u_s=0$, and the perturbation is a constant, non-zero wind shear parameter us, often measured or retrieved just before a flight begins. For V=480 knots, $U_s$=0.2 knots per nautical mile (nmi), and a straight line flight path distance of 2500 nmi, the reduction in flight time over the flight path is 11.8 minutes or 4 percent, relative to the time required for a constant heading flight (300.6, min versus 312.4 min). FIG. 1 graphically illustrates the constant heading flight path and an optimal solution flight path for this situation.

Figures 3, 4:
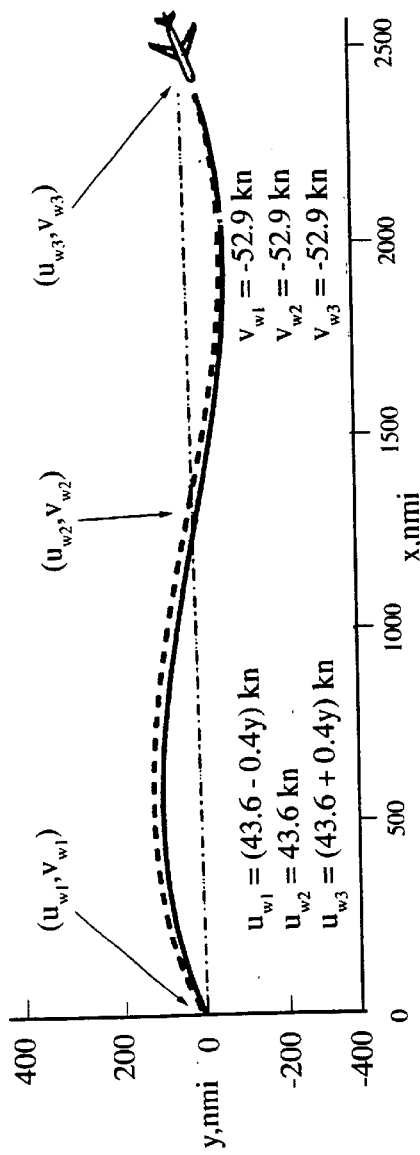
FIG. 4 graphically illustrates some feedback gain values computed for the wind pattern of FIG. 3, for different fractions of distance remaining.

In a second example applying the NOC approach, expressed in rotated, dimensionless coordinates and illustrated in FIG. 3, along-track and cross-track wind velocities are both non-zero:

$$L=2500 \text{ nmi}, \quad (43A)$$

$$V=480 \text{ knots}, \quad (43B)$$

$$u(x, y) = (43.6 - 0.4y) \text{ kn } (x = L) \quad (43C)$$
$$= 43.6 \text{ kn } (x = L/2)$$
$$= (43.6 + 0.4y) \text{ kn } (x = 0),$$

$$v(x,y)=-52.9 \text{ kn}, \quad (43D)$$

where the wind velocity components, u and v, are interpolated linearly in each of the regions 0<x<L/2 and L/2<x<L. Table 1 and FIG. 3 compare the values and the routes for a nominal solution flight path and for an optimal solution flight path using the NOC approach. Here, flight along a nominal solution route (y'=0) requires 346 min, and flight along an NOC-optimized route requires 341.1 min, a difference of 4.9 min or about 1.4 percent.

TABLE 1

Nominal and perturbed values of wind parameters

| | $V_{ws,1}$ (kn/nmi) | $V_{ws,2}$ (kn/nmi) | $V_{ws,3}$ (kn/nmi) | $u_{w,i}$ (i = 1, 2, 3) (kn) | $v_{w,i}$ (i = 1, 2, 3) (kn) |
|---|---|---|---|---|---|
| Nominal | 0 | 0 | 0 | 39.9 | 12.5 |
| Perturbed | 0.4 | 0 | -0.4 | 43.6 | -52.9 |

FIG. 4 graphically illustrates variation of a gain matrix coefficient $K_{u,i}$ with time-to-go parameter for three locations along a flight route, corresponding to source (i=1), mid-way (i=2) and destination (i=3). Each of the coefficients goes to 0 as the time-to-go parameter decreases to 0. The feedback gain corresponding to a perturbation in wind velocity at or near the destination clearly affects the entire flight route, where total flight time is to be minimized.

Figure 5:
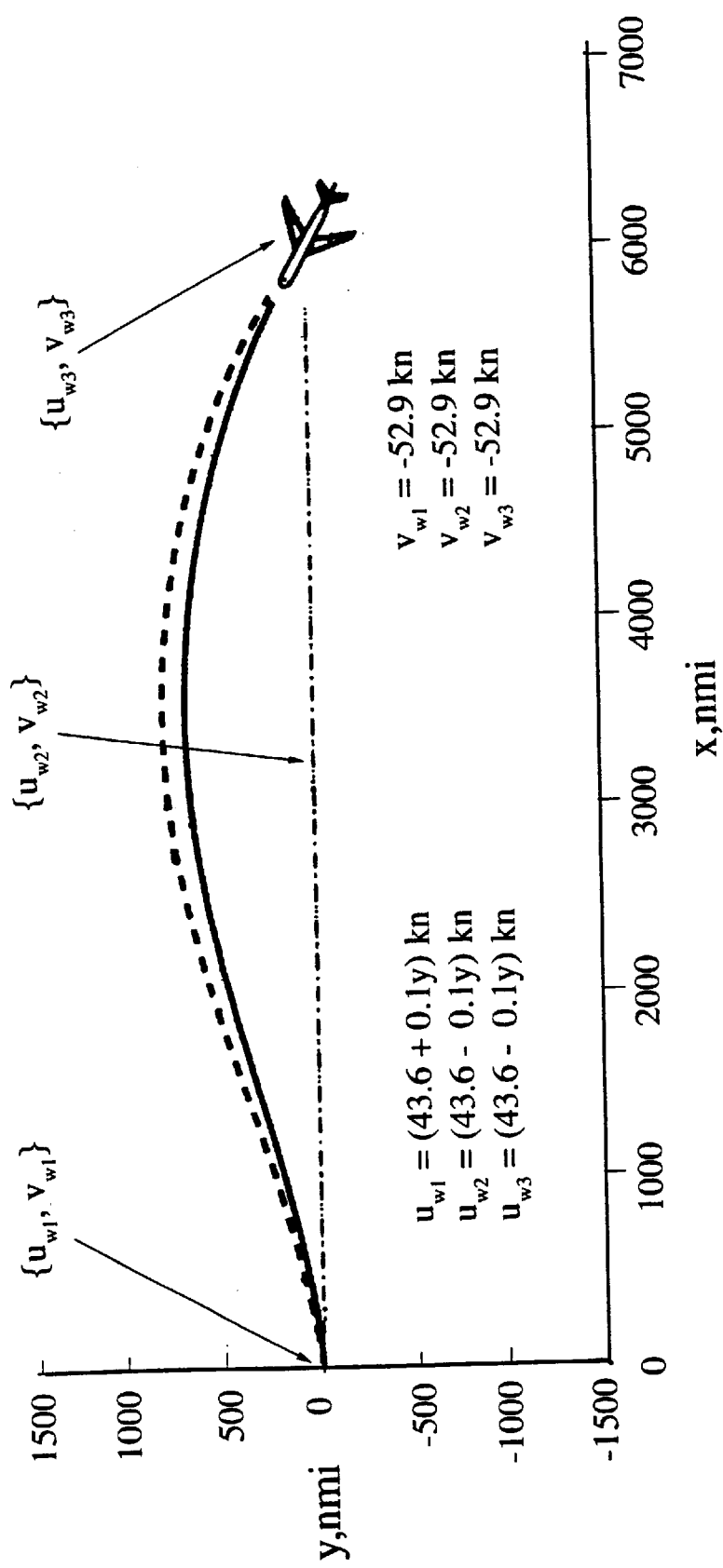

In a third example applying the NOC approach, expressed in standard coordinates and illustrated in FIG. 5, along-track and cross-track wind velocities are similar to the second example, but the flight distance is longer:

$$L=6000 \text{ nmi}, \quad (44A)$$

$$V=480 \text{ knots}, \quad (44B)$$

$$u(x, y) = (43.6 - 0.1y) \text{ kn } (x = L) \quad (44C)$$
$$= 43.6 \text{ kn } (x = L/2)$$
$$= (43.6 + 0.1y) \text{ kn } (x = 0),$$

$$v(x,y)=-52.9 \text{ kn}, \quad (44D)$$

where the wind velocity components, u and v, are again interpolated linearly in each of the regions 0<x<L/2 and L/2<x<L. Flight along a nominal solution route (y'=0) requires 830.5 min, and flight along an NOC-optimized route requires 803.3 min, a difference of 27.2 min or about 3.4 percent.

In the second and third examples, because the NOC gains are computed in dimensionless form, a family of NOC solutions can be generated or approximated by scaling, using the scaling parameters L, V and $V_{ws}$, among others. As an example of such scaling, the solution in the second example can be reconfigured to provide an optimal solution for a flight over 6000 nmi (third example) between source and destination waypoints with V=480 knots and $V_{ws}$=±0.1 knots/nmi. The dimensionless feedback gain coefficients remain the same, but the perturbation values are scaled according to Eqs. (4A)–(4E). The dimensionless shear perturbation at the origin is changed from (0.4)(2500)/480= 2.0833 to (0.1)(6,000)/480=1.25. In this mapping of the second example parameters onto the third example parameters, the flight time difference (nominal solution flight path versus optimal solution flight path) changes from 4.9 min (second example) to 27.2 min (third example).

The prescription of zero wind velocity for a nominal optimal solution and neighboring optimal gain computation can be replaced by another wind profile, such as constant wind velocity, constant cross-track wind shear or another generalization.

Where constant wind velocity is prescribed, the nominal optimal solution is easily computed. The heading angle $\theta_{nom}$ is perturbed slightly to cause the aircraft to maintain a great circle path. If the along-track and cross-track wind velocities are u0 and v0, respectively, the nominal heading angle in the rotated coordinate frame is given by $$\theta_{nom} = -\sin^{-1}(v0/V), \qquad (45)$$

where V is the (constant) aircraft speed, and the effective ground speed becomes $$Vg = V \cos \theta_{nom} + u0. \qquad (46)$$

One may use a more general wind profile when computing the nominal optimal solution, using any desired numerical optimization algorithm, such as a gradient method or Newton-Raphson method. For this more general profile, an analytical solution may not be possible, but the numerical solution is as straightforward as the solution for zero wind velocity.

An advantage in using a wind profile other than the zero wind prescription is that the neighboring optimal solution may be more accurate. A disadvantage in using a wind profile other than zero wind prescription is that the nominal optimal solution and corresponding neighboring optimal feedback gains must be recomputed for each specific waypoint pair and wind condition.

One may apply iterations to a neighboring optimal aircraft routing (NOAR) algorithm. Here, one assumes zero wind velocity to compute the nominal optimal control and the corresponding neighboring optimal feedback gains. The neighboring optimal solution is then computed as indicated in the preceding development by incorporating the actual wind conditions measured for the particular flight. The computed neighboring optimal trajectory is used as a (new) nominal optimal solution, and the NOAR algorithm is applied again, but with the perturbations in wind and wind shear computed with respect to the (new) nominal optimal solution path. The resulting heading angle perturbations are now added to the nominal heading computed during the preceding iteration. This iterative process is repeated until the solution has converged to within a selected maximum inaccuracy. In many instances, a first iteration provides a (new) solution that is already sufficiently accurate, although additional iterations can be applied.

Figure 6:
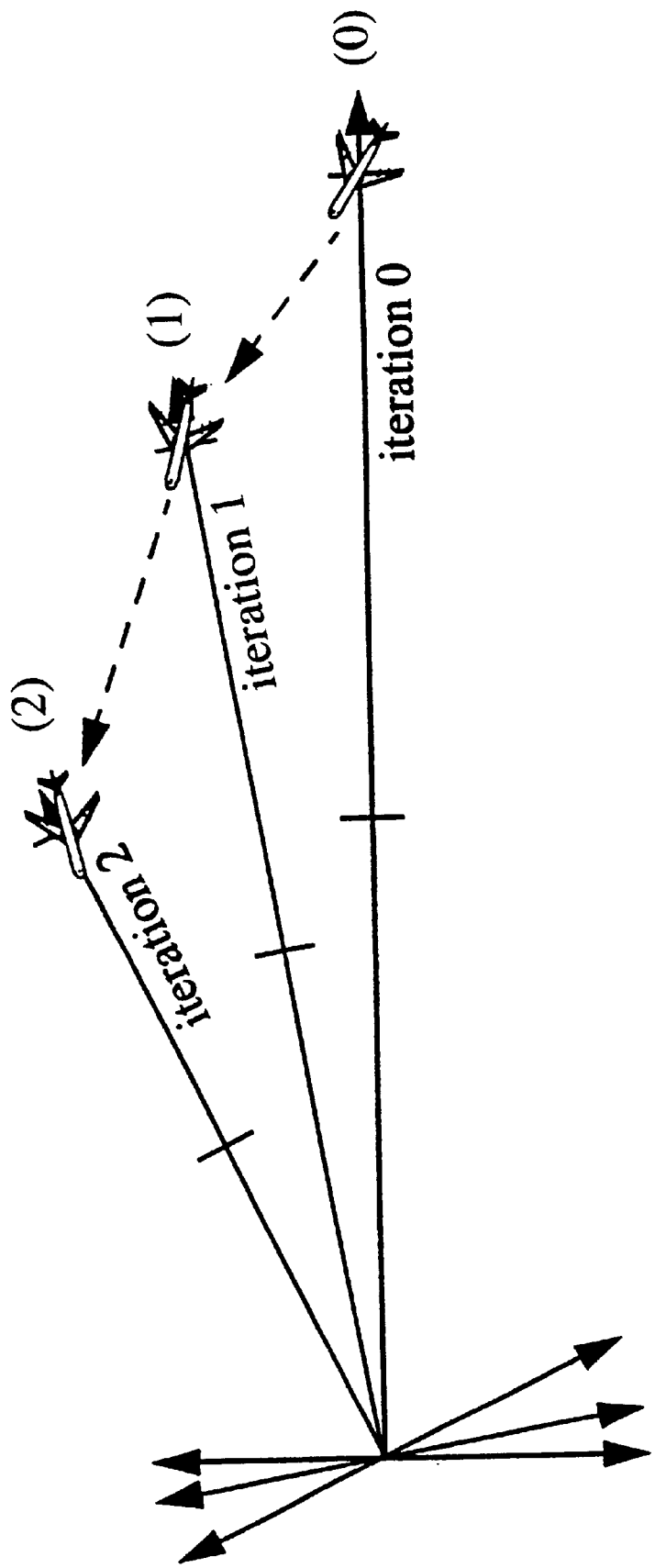
FIG. 6 graphically illustrates another embodiment, in which an optimal solution to an intermediate waypoint is extended to a subsequent waypoint.

Another extension to the NOAR algorithm restarts the NOAR computation after each iteration during the heading perturbation calculations. Beginning with the aircraft at the source waypoint (x'=1, y'=0), from a time t'=0 (position 0 in FIG. 6) to a time t'=Δt'(>0), one computes and applies the neighboring optimal heading perturbations as described in the preceding to bring the aircraft to a new location with coordinates x'=1−Δx' and y'=Δy' (position 1 in FIG. 6). A new coordinate rotation and normalization is performed to transform to a new normalized (dimensionless) coordinate frame for which $x'_{new}$=1 and $y'_{new}$=0. The normalized time is also reset to $t'_{new}$=0. This process is repeated to move the aircraft to a new resulting location (position 2 in FIG. 6). The number of iterations is not limited to 3. This approach allows substantially exact feedback gains to be computed at each iterative step, rather than being obtained from a lookup table. This approach effectively reduces the scale of the wind grid as the aircraft approaches the destination waypoint so that the wind grid resolution improves as the aircraft approaches the destination.

The aircraft speed V need not be constant throughout the flight. If one uses a variable speed profile, the aircraft speed to be applied at a given location (x,y) must be used in the coordinate normalization process. With that minor modification incorporated, the remainder of the NOAR algorithm is applied as discussed in the preceding. For example, if an aircraft speed Vj applies at a coordinate value $x'_j$(j=1, 2, 3), the wind components would be normalized as follows: $\eta_{Vj}$=vj/Vj(j=1, 2, 3), where vj refers to a wind velocity component.

The NOAR can be extended to include variations in wind velocity in the vertical coordinate. One difficulty with including the vertical coordinate is that commercial jet aircraft performance varies strongly with altitude. Although a primary goal of the NOAR algorithm is to determine a minimum-time path between the source and destination waypoints, the overriding goal is to determine a minimum-fuel-usage path. Fuel minimization is assumed to have been performed by choosing an appropriate flight altitude and airspeed V. By performing a minimum-time optimization for the selected fixed altitude, fuel consumption is further reduced.

A straightforward extension would include aircraft altitude as a control variable and to introduce a three-dimensional wind model. The resulting vertical wind profile would be evaluated in terms of efficiency of aircraft and engine performance. Another level of complexity in this extension would include state models for the aircraft fuel flow rate as a function of altitude and airspeed, when computing the NOC gains. This is a non-trivial problem.

Wind shear and bias wind parameters are determined from measurements taken at a sparse grid of points adjacent to one or more candidate flight routes. If the normalized wind velocity parameters $\eta_u$ and $\eta_v$ (introduced in Eqs. (5) and (6)) are determined at two locations (x1',y1') and (x2',y2'), the corresponding wind shear parameters at an intermediate location (x3',y3'), with x1'≤x3'≤x2' and y1'≤y3'≤y2', can be estimated as $$\eta_{us}(x3',y3') = \{\eta_u(x',y1') - \eta_u(x', y2')\}/(y1'-y2'), \qquad (47)$$

$$\eta_{vs}(x3',y3') = \{\eta_v(x',y1') - \eta_v(x', y2')\}/(y1'-y2'). \qquad (48)$$

Corresponding bias wind parameters can be estimated as $$\eta_u(x3',y3')=\{(x1'-x3')\eta_u(x',y1')+(x3'-x2')\eta_u(x',y2')\}/(x1'-x2'), \quad (49)$$

$$\eta_v(x3',y3')=\{(x1'-x3')\eta_v(x',y1')+(x3'-x2')\eta_v(x',y2')\}/(x1'-x2'). \quad (50)$$

Another approach for estimating wind shear and wind bias parameters fits two-dimensional polynomials, $p_u(x',y')$ and $p_v(x',y')$ for measurements, $\eta_u(x',y')$ and $\eta_v(x',y')$, at several adjacent locations $(x',y')$, estimates the wind bias values as $$\eta_u(x3',y3')=p_u(x3',y3'), \quad (51)$$

$$\eta_v(x3',y3')=p_v(x3',y3'), \quad (52)$$

and estimates the wind shear values as $$\eta_{us}(x3',y3')=\{\partial\eta_u(x',y')/\partial y'\}_{(x3',y3')}, \quad (53)$$

$$\eta_{vs}(x3',y3')=\{\partial\eta_v(x',y')/\partial y'\}_{(x3',y3')}. \quad (54)$$

The normalized coordinates values $(x3',y3')$ can be estimated using coordinates values for a preceding location on the flight path and a heading angle for that preceding location. Other interpolation methods can be used to estimate the wind bias and wind shear parameters from a sparse grid of measurements.

The wind shear values, which are modeled as constants in Eqs. (9), (10) and 14A)–(14C), can be generalized further as first order lags or as sinusoidally varying functions of the cross-track coordinate y'. However, use of constant wind shear values (zero or non-zero) is expected to be more useful in a general situation.

The NOAR computations can be made on board the aircraft, before and/or during the flight, or can be made at another ("off-board") computing facility not located on the aircraft. Alternatively, a combination of on-board and off-board computations can be made. This combination approach would be useful where updated or corrected wind information becomes available after the aircraft has departed. An off-board facility can receive updated wind information and can perform a selected preliminary portion of, or all, NOAR computations and can transmit the raw data and/or the results of these computations to the target aircraft, for use in computing and adjusting the results of the modified NOAR computations to provide an adjusted NOAR flight route; or the aircraft can obtain wind measurements locally and can provide some or all wind information updates itself as the flight progresses.

The NOAR algorithm may be applied in at least two distinctly different modes. In the first of these modes, the calculation of a neighboring optimal trajectory in either on-board or off-board systems may be made just prior to flight so that the aircraft can be directed to follw the pre-computed trajectory. The neighboring optimal trajectory may be updated as often as desired as new wind information becomes available.

In the second mode, instead of computing the entire neighboring optimal trajectory prior to flight in either on-board or off-board systems, one may use the neighboring optimal wind routing algorithm in a real-time feedback mode. In this mode, the computer would continuously calculate the current optimal heading to use to cause the aircraft to ultimately follow a neighboring optimal trajectory.

Where relatively few intermediate waypoints are specified, aircraft personnel may be able to use a hand held specially programmed computer or one or more nomographs or dedicated slide rule mechanisms to determine heading angle adjustments and the like at selected locations along the flight route.

What is claimed is:

1. A method for determining an optimal route for an aircraft in moving between first and second waypoints in the presence of variable winds, the method comprising:

providing a nominal solution for a route of an aircraft moving with a selected speed between the first and second waypoints in the presence of a first wind environment for which the nominal solution can be determined;

providing values for a second wind environment that differs from the first wind environment; and using at least one computer to determine a neighboring optimal control solution for an aircraft route between the first and second waypoints in the presence of the second wind environment.

2. The method of claim 1, further comprising expressing said first and second wind environments and said location coordinates for said nominal route and for said optimal route in dimensionless variables.

3. The method of claim 1, further comprising providing values for wind velocity in said fist wind environment that are substantially constant.

4. The method of claim 1, further comprising providing values for wind velocity in said first wind environment that are substantially zero.

5. The method of claim 1, further comprising providing values for cross-track wind shear in said first wind environment that is substantially constant.

6. The method of claim 1, further comprising providing values for wind velocity in said second wind environment varies linearly with at least one location coordinate.

7. The method of claim 1, further comprising selecting said aircraft speed to be constant.

8. The method of claim 1, further comprising selecting said aircraft speed to have at least first and second distinct values at first and second locations alone said route.

9. The method of claim 1, further comprising, providing values for wind velocity in said second wind environment varies linearly with at least one location coordinate within each of at least two segments that extend between said first and second waypoints.

10. The method of claim 1, wherein said step of providing said neighboring optimal solution comprises:

converting aircraft latitude and longitude coordinates into rotated angular coordinates so that said nominal solution lies along a great circle for the Earth;

computing perturbations in at least one variable describing a state of said aircraft for said optimal solution relative to said nominal solution, and in at least one variable describing said second wind environment relative to said first wind environment;

estimating at least one feedback gain coefficient for the at least one variable for the state of said aircraft;

multiplying the estimated at least one gain coefficient by the perturbation in the at least one variable for the state of said aircraft to obtain at least one product value;

summing the product values for the at least one variable for the state of said aircraft at at least one selected location along said route;

using the sum of product values to obtain a heading angle perturbation of said aircraft for the at least one selected location; and combining the heading angle perturbation to said nominal solution heading angle to obtain an optimal heading angle at the at least one selected location.

11. The method of claim 10, further comprising expressing said first and second wind environments and said location coordinates for said nominal route and for said optimal route in dimensionless variables.

12. The method of claim 1, further comprising using at least one of (i) a computer located on board said aircraft and (ii) a computer that is not located on board said aircraft to determine said neighboring optimal solution.

13. The method of claim 1, further comprising providing information on said second wind environment, after said aircraft has departed from said first waypoint, for at least one of (i) a computer located on board said aircraft and (ii) a computer that is not located on board said aircraft, and determining an updated neighboring optimal solution.

14. The method of claim 1, further comprising providing at least one of said values for said second wind environment using measurements of a wind value made at at least two locations adjacent to a flight route given by said nominal solution.

15. A method for determining an optimal route for an aircraft in moving between first and second waypoints in the presence of variable winds, the method comprising:
providing a first nominal solution for a route of an aircraft moving with a selected speed between the first waypoint and a selected third waypoint, intermediate between the first and second waypoints, in the presence of a first waypoint first wind environment for which a first waypoint nominal solution can be determined;
providing values for a first waypoint second wind environment that differs from the first waypoint first wind environment;
determining a neighboring optimal solution for an aircraft route between the first and third waypoints in the presence of the fist waypoint second wind environment;
providing a second nominal solution for a route of an aircraft moving with a selected speed between the third waypoint and a selected fourth waypoint, intermediate between the third and second waypoints, in the presence of a third waypoint first wind environment for which a second nominal solution can be determined;
providing values for a third waypoint second wind environment that differs from the third waypoint first wind environment; and
determining a neighboring optimal solution for an aircraft route between the third and fourth waypoints in the presence of the third waypoint second wind environment.

16. The method of claim 15, further comprising selecting said fourth waypoint to substantially coincide with said second waypoint.

17. A system for determining an optimal route for an aircraft in moving between first and second waypoints in the presence of variable winds, the system comprising a computer that is programmed:
to provide a nominal solution for a route of an aircraft moving with a selected speed between the first and second waypoints in the presence of a first wind environment for which the nominal solution can be determined;
to provide values for a second wind environment that differs from the first wind environment; and
to determine a neighboring optimal control solution for an aircraft route between the first and second waypoints in the presence of the second wind environment.

18. The system of claim 17, wherein said computer is further programmed to express said first and second wind environments and said location coordinates for said nominal route and said optimal route in dimensionless variables.

19. The system of claim 17, wherein said computer is further programmed to provide values for wind velocity in said second wind environment that are substantially constant.

20. The system of claim 17, wherein said computer is further programmed to provide values for wind velocity in said second wind environment that are substantially zero.

21. The method of claim 17, wherein said computer is further programmed to provide values for cross-track wind shear that are substantially constant.

22. The system of claim 17, wherein said computer is further programmed to provide values for wind velocity in said second wind environment that vary linearly with at least one location coordinate.

23. The system of claim 17, wherein said computer is further programmed to select said aircraft speed to be constant.

24. The system of claim 17, wherein said computer is further programmed to have at least first and second distinct values at first and second locations along said route.

25. The system of claim 17, wherein said computer is further programmed to provide values for wind velocity in said second wind environment that vary linearly with at least one location coordinate within each of at least two segments that extend between said first and second waypoints.

26. The system of claim 17, wherein said computer is further programmed:
to convert aircraft latitude and longitude coordinates into rotated angular coordinates so that said nominal solution lies along a great circle for the Earth;
to compute perturbations in at least one variable describing a state of said aircraft for said optimal solution relative to said nominal solution, and in at least one variable describing said second wind environment relative to said first wind environment;
to estimate at least one feedback gain coefficient for the at least one variable for the state of said aircraft;
to multiply the estimated at least one gain coefficient by the perturbation in the at least one variable for the state of mid aircraft to obtain at least one product value;
to sum the product values for the at least one variable for the state of said aircraft at at least one selected location along said route;
to use the sum of product values to obtain a heading angle perturbation of said aircraft for the at least one selected location; and
to combine the heading angle perturbation with said nominal solution heading angle to obtain an optimal heading angle at the at least one selected location.

27. The system of claim 26, wherein said computer is further programmed to express said first and second wind environments and said location coordinates for said nominal route and for said optimal route in dimensionless variables.

28. The system of claim 17, wherein said programmed computer is located at at least one of (i) a location on board said aircraft and (ii) at a location not on board said aircraft, to determine said neighboring optimal solution.

29. The system of claim 28, wherein said computer is further programmed to receive information on said second wind environment, after said aircraft has departed from said first waypoint, and to determine an updated neighboring optimal solution.

30. The system of claim 17, wherein at least one of said values for said second wind environment is provided using measurements of a wind value made at at least two locations adjacent to a flight route given by said nominal solution.

31. A system for determining an optimal route for an aircraft in moving between first and second waypoints in the presence of variable winds, the method comprising a computer that is programmed:

to provide a first nominal solution for a route of an aircraft moving with a selected speed between the first waypoint and a selected third waypoint, intermediate between the first and second waypoints, in the presence of a first waypoint first wind environment for which a first waypoint nominal solution can be determined;

to provide values for a first waypoint second wind environment that differs from the first waypoint first wind environment;

to determine a neighboring optimal solution for an aircraft route between the first and third waypoints in the presence of the first waypoint second wind environment;

to provide a second nominal solution for an aircraft route between the third waypoint and a selected fourth waypoint intermediate between the third and second waypoints, in the presence of a third waypoint first wind environment for which a second nominal solution can be determined;

to provide values for a third waypoint second wind environment that differs from the third waypoint first wind environment; and to determine a neighboring optimal solution for an aircraft route between the third and fourth waypoints in the presence of the third waypoint second wind environment.

32. The system of claim 31, wherein said computer is further programmed to select said fourth waypoint to substantially coincide with said second waypoint.

* * * * *